United States Patent
Sakai

Patent Number: 5,414,530
Date of Patent: May 9, 1995

[54] IMAGE RECORDING METHOD AND APPARATUS

[75] Inventor: Masahiko Sakai, Kawasaki, Japan

[73] Assignee: Canon Kabushiki Kaisha, Tokyo, Japan

[21] Appl. No.: 847,268

[22] Filed: Mar. 10, 1992

[30] Foreign Application Priority Data

Mar. 12, 1991 [JP] Japan ............... 3-046369
Mar. 12, 1991 [JP] Japan ............... 3-046370

[51] Int. Cl.⁶ .................................. G06F 3/00
[52] U.S. Cl. ......................... 358/451; 358/430; 348/334
[58] Field of Search ............... 358/140, 133, 261, 85, 358/260, 136, 280, 57, 41, 22, 135, 136, 105, 409, 451, 261.1, 261.2, 160, 464, 430, 443, 261.3, 160, 426, 462, 467; 341/87, 95, 51, 67, 106; 382/9, 56, 36, 48, 50; 395/375

[56] References Cited

U.S. PATENT DOCUMENTS

| | | |
|---|---|---|
| 4,204,232 | 5/1980 | Mizuno . |
| 4,271,476 | 6/1981 | Lotspiech ............... 364/515 |
| 4,316,222 | 2/1982 | Subramaniam ............... 358/261 |
| 4,654,484 | 3/1987 | Reiffel et al. ............... 358/133 X |
| 4,827,330 | 5/1989 | Walsh et al. ............... 358/280 |
| 4,899,394 | 2/1990 | Lee ............... 382/9 |
| 4,929,946 | 5/1990 | O'Brien et al. ............... 341/87 |
| 5,003,307 | 3/1991 | Whiting et al. ............... 341/51 |
| 5,016,009 | 5/1991 | Whiting et al. ............... 341/67 |
| 5,055,919 | 10/1991 | Klein et al. ............... 358/261.1 |
| 5,095,374 | 3/1992 | Klein et al. ............... 358/430 |
| 5,126,739 | 6/1992 | Whiting et al. ............... 341/106 |
| 5,146,221 | 9/1992 | Whiting et al. ............... 341/67 |
| 5,204,756 | 4/1993 | Chevion et al. ............... 358/426 |

FOREIGN PATENT DOCUMENTS

| | | |
|---|---|---|
| 0042981 | 1/1982 | European Pat. Off. . |
| 0349234 | 1/1990 | European Pat. Off. . |

OTHER PUBLICATIONS

IBM Tech. Discl. Bull., vol. 30, No. 1, Jun. 1987, pp. 314–317, "Preprocessing method for binary image compression".

*Primary Examiner*—Paul Ip
*Attorney, Agent, or Firm*—Fitzpatrick, Cella, Harper & Scinto

[57] ABSTRACT

Disclosed are recording method and apparatus for inputting recording information in page units, developing the recording information into bit-map information and recording the bit-map information. The bit-map information is corrected, before it is compressed by a compressing circuit, in dependence upon the compression ratio of the compressing circuit, the corrected bit-map information is then compressed by the compressing circuit and stored in a pixel memory. Recording is performed upon expanding the bit-map information stored in the pixel memory. As a result, the blurring of characters and fine lines by compression can be prevented. Further, it is determined whether the recording information is text data or image data. By compressing the text data at a compression ratio smaller than that used to compress the image data, a decline in the image quality of the text data recorded is prevented.

16 Claims, 6 Drawing Sheets

IMAGE RECORDING METHOD AND APPARATUS

BACKGROUND OF THE INVENTION

1. Field of the Invention

This invention relates to a recording method and apparatus, to which text data or image data is inputted, for forming an image on a recording medium by bit-map development.

2. Description of the Related Art

Figure 6:
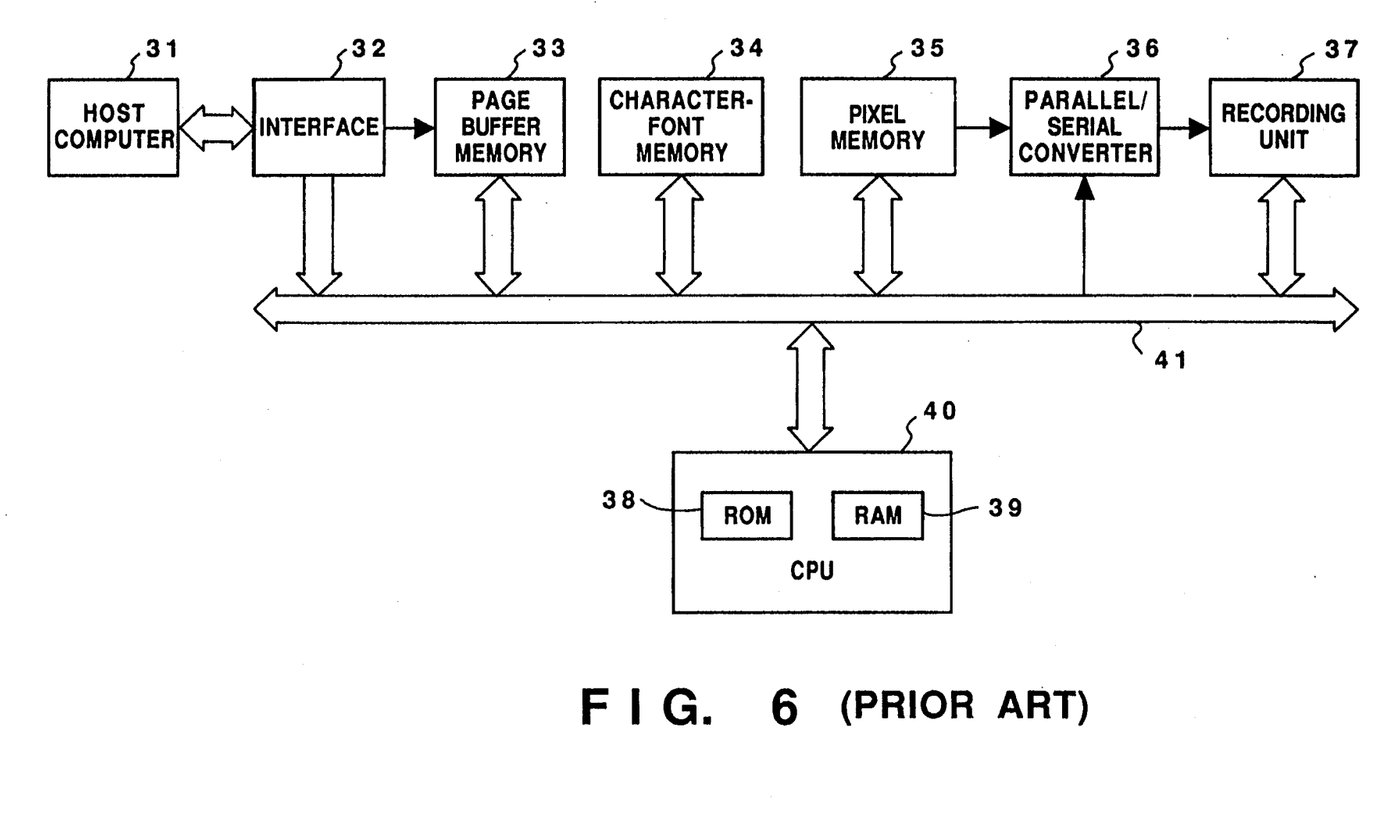
FIG. 6 is a block diagram showing the construction of a printer control unit in a printer apparatus according to the prior art.

A printer apparatus according to the prior art is constructed as shown in FIG. 6. In this arrangement, printing information (character codes and the like) sent from a host computer 31 is stored in a page buffer memory 33 via an interface 32. A character code which enters from the host computer 31 undergoes pattern development on a following RAM 39 based upon a character font that has been stored in a character-font memory 34. A pixel memory 35 stores compressed image data comprising the character data thus subjected to pattern development, or image data and the like. A parallel-serial converter 36 converts parallel data (image data), expanded and read out of the pixel memory 35, into serial data and sends the serial data to a recording unit 37. A CPU 40 has a ROM 38 and a RAM 39 and controls page editing, recording processing, and the like, based upon a control program that has been stored in the ROM 38. The RAM 39 is used as a working area during execution of various programs. The recording unit 37, which comprises a laser-beam printer or the like, causes a light beam to irradiate and scan a photosensitive drum based upon inputted image information, thereby performing recording by forming an electrostatic latent image. Numeral 41 denotes a system bus, above-described units are connected to the CPU 40 via the system bus 41.

In a case where image data is stored in the pixel memory 35 upon being compressed, the example of the prior art described above is so adapted that image data for text and image data for images is compressed at an identical ratio. As a consequence, when use is made of a compression method which employs irreversible coding, the recording quality of the text data, namely of characters, symbols, and the like, is greatly diminished.

Further, in a case where a bit-map image obtained by bit-map development of character or line-drawing data is compressed in the example of the prior art described above, the following problems arise depending upon the compression method:

(1) When a fine or slender character is recorded, the recording quality of the character undergoes a pronounced decline. This is caused by character blurring or extinction of lines, and the like.

(2) When a fine or slender line drawing is recorded, lines which should be recorded are not.

SUMMARY OF THE INVENTION

Accordingly, an object of the present invention is to provide a recording method and apparatus capable of the high-quality recording of text data and image data of recording information in which the text data and image data are mixed.

According to the present invention, the foregoing object is attained by providing a recording apparatus to which recording information in page units is inputted and recorded, comprising discriminating means for determining whether the recording information is text data or image data, first memory means for subjecting text data discriminated by the discriminating means to pattern development and storing the resulting pattern data upon compressing the pattern data, second memory means for storing the image data upon compressing the image data at a compression ratio larger than that of the first memory means, and recording means for expanding and recording, on a recording medium, the compressed pattern data stored in the first memory means and the compressed image data stored in the second memory means.

According to the present invention, the foregoing object is attained by providing a recording method for inputting recording information in page units and recording the recording information, comprising the steps of discriminating whether the recording information is text data or image data, subjecting the discriminated text data to pattern development and storing the resulting pattern data upon compressing the pattern data, storing the discriminated image data upon compressing the image data at a compression ratio larger than that of the text data, and expanding and recording, on a recording medium, the compressed and stored pattern data and image data.

A further object of the present invention is to provide a recording method and apparatus in which the recording quality of fine characters and fine lines is improved.

According to the present invention, the foregoing object is attained by providing a recording apparatus to which recording information in page units is inputted, developed into bit-map information and recorded, comprising compressing means for compressing bit-map information, recording means for storing the bit-map information compressed by the compressing means, expanding means for expanding the compressed information stored in the memory means, and correcting means for correcting the bit-map information, before compression is carried out by the compressing means, in dependence upon the compression ratio of the compressing means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

Figure 2:
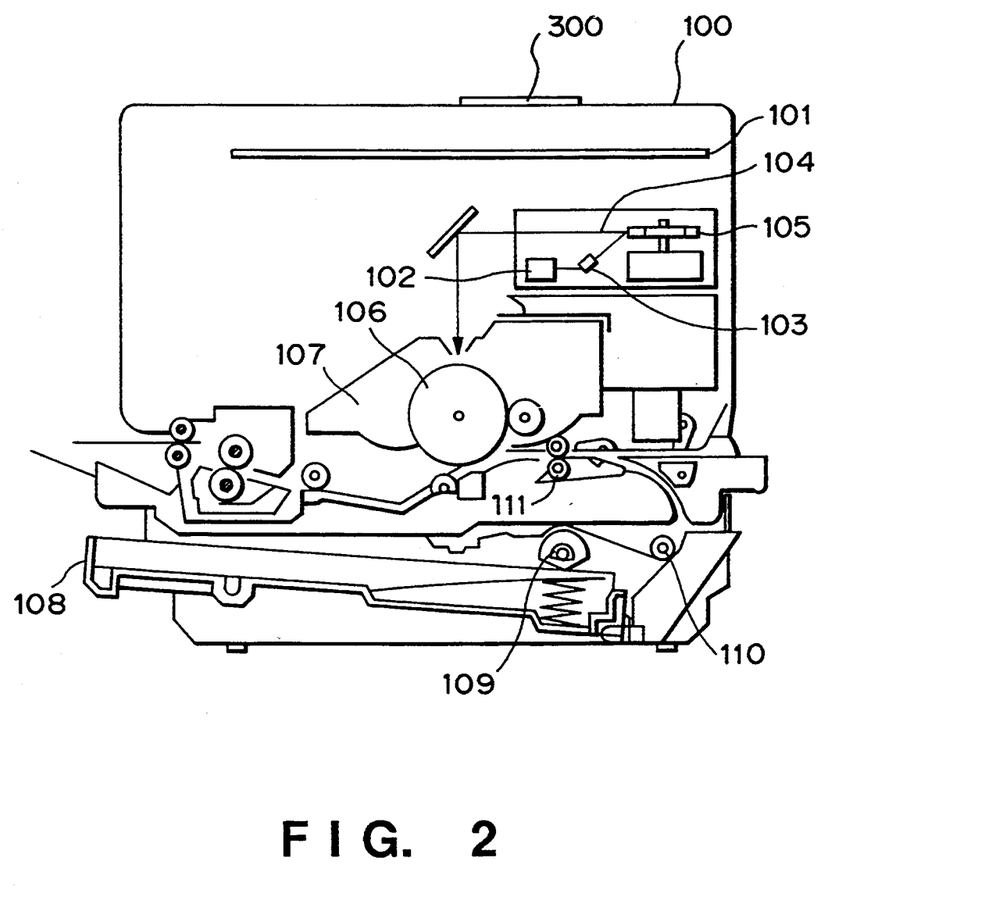
FIG. 2 is a sectional view showing the internal structure of a laser-beam printer in the embodiment of the present invention.

FIG. 2 is a sectional view showing the internal structure of a laser-beam printer (LBP) 100 according to the present embodiment. The LBP 100 is so adapted that a character code or image data enters from a data source (a host computer or the like), not shown, and is capable of being printed upon being subjected to pattern development.

More specifically, the LBP 100 accepts an input of character information (character codes), form information or a macro instruction and the like supplied by an externally connected host computer or the like, stores the input, creates a character pattern or form pattern, and the like, corresponding to the input, and forms an image on recording paper, which is the recording medium. Numeral 300 denotes a control panel having various switches operated by the user, as well as an LED display and the like. Numeral 101 designates a printer control unit for controlling the overall LBP 100 and analyzing printing information and the like supplied by the host computer. The printer control unit 101 creates pattern information from a character code or graphic pattern, converts the pattern information into a video signal and delivers the video signal to a laser driver 102.

The laser driver 102 is a circuit for driving a semiconductor laser 103 and is adapted to turn the semiconductor laser 103 on and off in dependence upon the video signal applied thereto. A laser beam 104 is made to scan an electrostatic drum 106 by being swept back and forth by a polygon mirror. As a result, an electrostatic latent image of a character pattern or graphic pattern is formed on the electrostatic drum 106. The latent image is transferred to the recording paper after being developed by a developing unit 107 arrayed about the periphery of the electrostatic drum 106. Cut sheets of paper for use in a cassette 108 are employed as the recording paper. The cut sheets are accommodated in the paper cassette 108 loaded in the LBP 100 and is fed into the apparatus by a feed roller 109 and conveyor rollers 110, 111, whereby the paper is supplied to the electrostatic drum 106.

Figure 1:
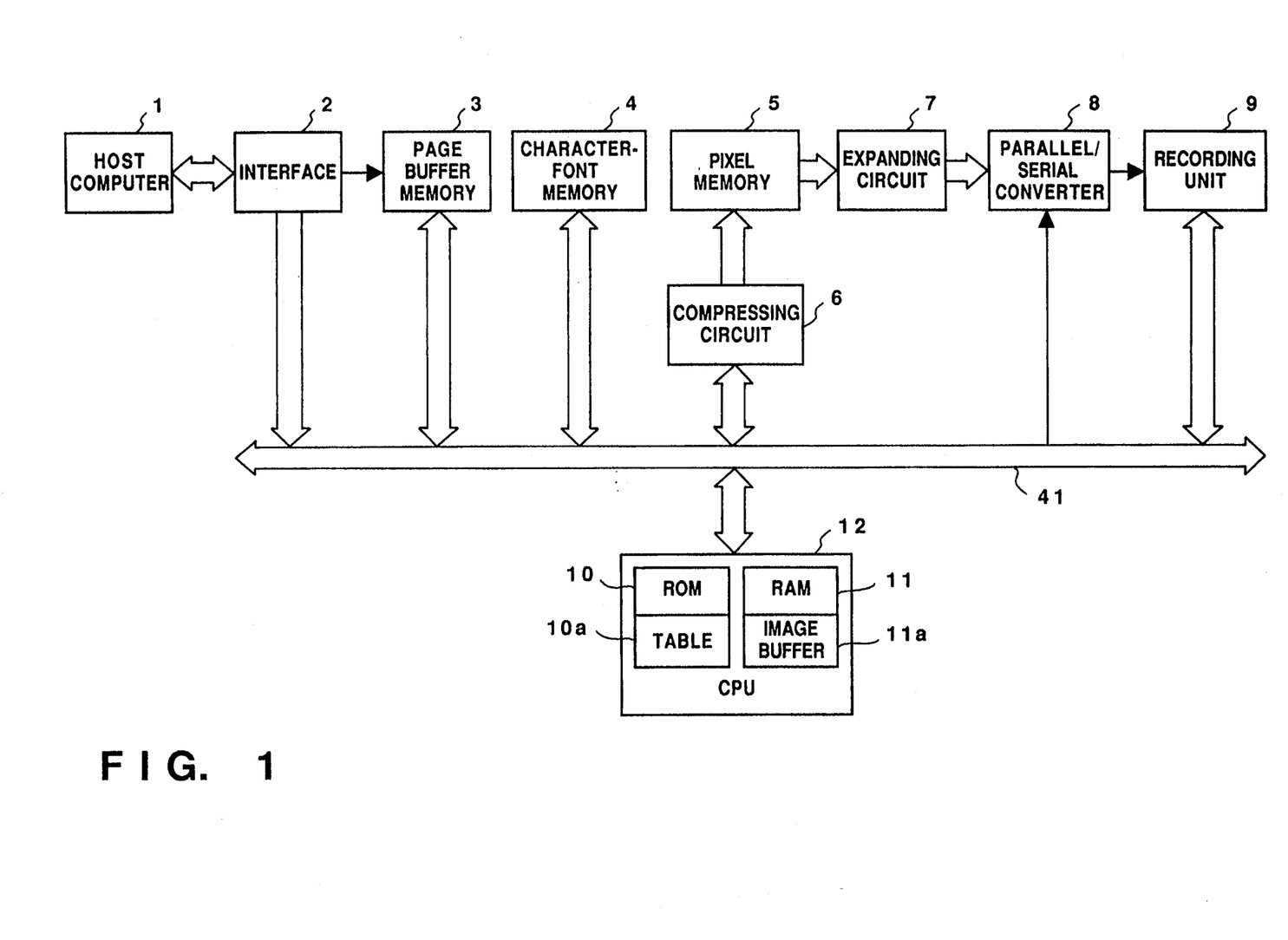
FIG. 1 is a block diagram illustrating the construction of a printer control unit in a printer apparatus according to a first embodiment of the present invention.

FIG. 1 is a block diagram showing the construction of the printer control unit 101 of the printer apparatus according to the first embodiment of the present invention.

As shown in FIG. 1, recording information sent from a host computer 1 is stored in a page buffer memory 3 via an interface 2. A character-font memory 4 stores character-pattern data corresponding to character codes and is referred to when pattern development is applied to a character code inputted from the host computer 1 in the following image buffer 11a of RAM 11. A pixel memory 5 stores the pattern information, which has been developed by making reference to the character-font memory 4, after the information has been compressed by a compressing circuit 6. An expanding circuit 7 expands the compressed pattern data that has been stored in the pixel memory 5.

Numeral 8 denotes a parallel-serial converter for converting the parallel bit-map image data sent from the expanding circuit 7 into serial data and transmitting the serial data to a recording unit 9 as raster data. As described above with reference to FIG. 2, the recording unit 9 causes the light beam irradiating the photosensitive drum 106 to scan the drum 106 based upon the inputted raster data, thereby forming an electrostatic latent image to perform printing. Thus, the recording unit 9 employs a so-called electrophotographic process. Numeral 12 denotes a CPU having a ROM 10 and a RAM 11. The CPU 12 controls page editing, recording processing and the like in accordance with a control program, stored in the ROM 10, illustrated by the flowchart of FIG. 3. The RAM 11, which is employed as a working area during execution of various programs, is used to temporarily store various data. As will be explained later, the ROM 10 has a table 10a which stores data indicating whether it is necessary to correct a character pattern or graphic pattern in dependence upon the compression ratio. The RAM 11 has an image buffer 11a for storing image data which has undergone pattern development. Those units are connected to the CPU 12 via the system bus 41.

Figure 3:
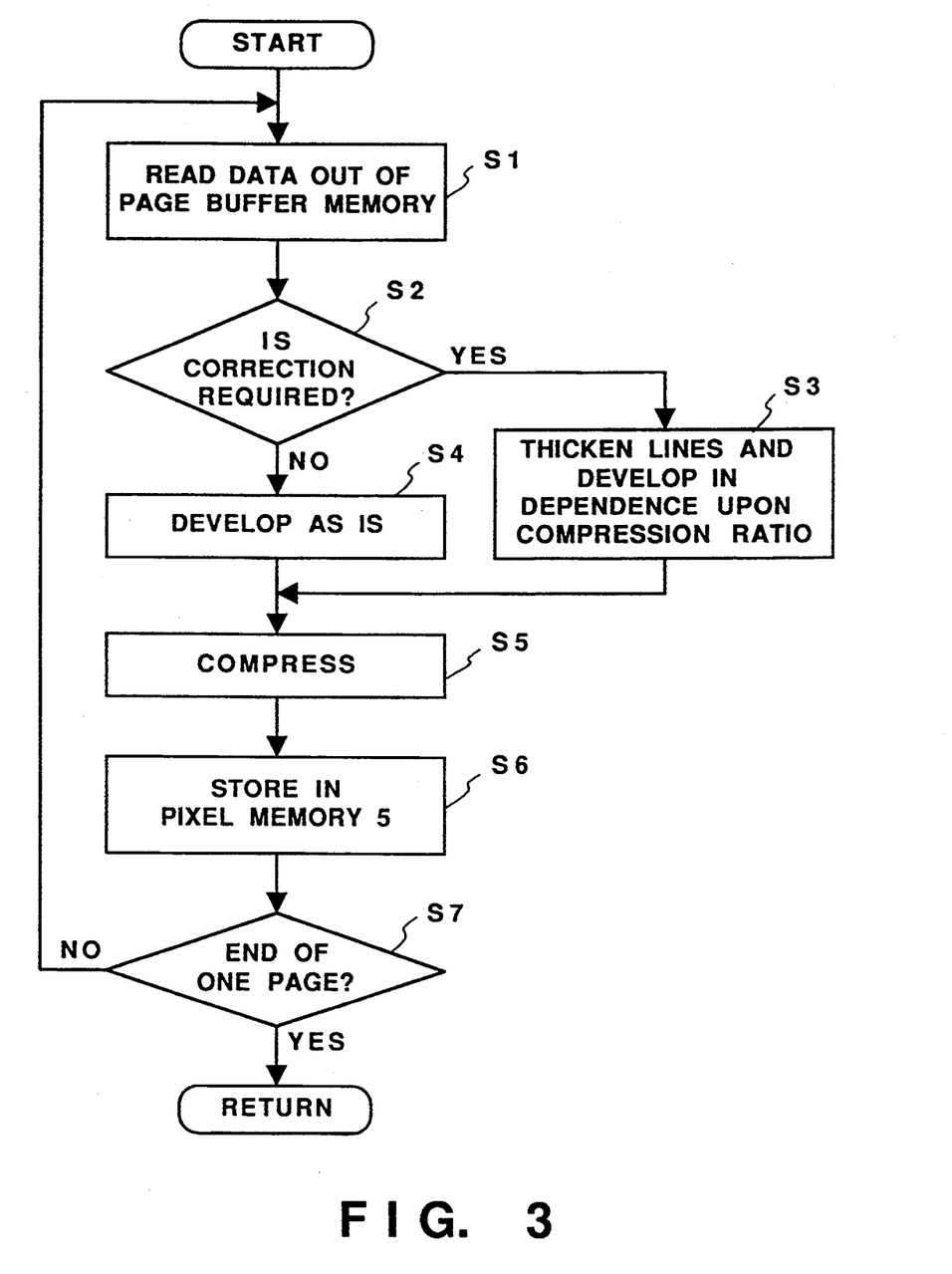
FIG. 3 is a flowchart showing bit-map development processing in the printer apparatus of the first embodiment.

The operation of the printer apparatus of the first embodiment will now be described with reference to the flowchart of FIG. 3.

At step S1 of the flowchart, character-code information or graphics-control information is read out of the page buffer memory 3. The program then proceeds to step S2, at which it is determined whether there is a need to correct the character-code information or graphics information at the time of pattern development, namely whether it is necessary to thicken line portions. If correction is unnecessary, the program proceeds to step S4, at which a character code is developed into a pattern in the image buffer 11a of RAM 11 by referring to the character-font memory 4, and the graphics information is developed as is, in the form of image data, in the image buffer 11a of the RAM 11. Processing is then executed from step S5 onward.

If it is decided at step S2 that the correction is required, i.e., line thickening is required, then the program proceeds to step S3, at which the character pattern developed by referring to the character-font memory 4 or the line-drawing data of the graphics information is corrected, so as to perform line thickening, in dependence upon the compression ratio of compression processing executed at step S5. The corrected character-pattern data and line-drawing data is developed and stored in the image buffer 11a of RAM 11.

Next, the program proceeds to step S5, at which the character-pattern data and line-drawing data stored in the image buffer 11a is compressed by the compressing circuit 6, after which the compressed data is stored in the pixel memory 5 at step S6. The program then proceeds to step S7.

The decision of step S2, namely the decision as to whether a correction for performing line thickening is required, is made upon taking into consideration the possibility that lines will disappear and the like as a result of compression. The decision is made based upon the relationship between the compression ratio of the compressing circuit 6 and the thickness of lines in the pattern data or line-image data. The data serving as the judgment criteria is stored in the ROM 10 as the table 10a, in which compression ratios and the corresponding character-code or line-drawing information are correlated. Accordingly, it is determined at step S2 whether a correction is necessary by referring to table 10a of ROM 10.

It is determined at step S7 whether the processing of one page has been completed. If the answer is YES, the program returns to the original processing routine. If the answer is NO, on the other hand, the program returns to step S1, at which the processing set forth above is executed.

In the embodiment described above, the processing for compression and expansion of the data is implemented by hardware using the compression circuit 6 and the expanding circuit 7. However, it is possible to implement the foregoing by software stored in the ROM 10. When the recording unit 9 performs compression and expansion of the image data in the case of a color printer, there are instances where lines cannot be seen depending upon the color recorded. In cases such as this, it will suffice to adopt an arrangement in which it is decided whether or not to correct the image data depending upon the recording color of this image data.

In accordance with the first embodiment, as described above, the disappearance of fine characters or fine lines due to compression and expansion can be prevented by correcting the character or line-drawing data, i.e., by thickening fine-line portions, in dependence upon the data compression ratio when the bit-map information is developed.

A second embodiment of the present invention will now be described with reference to FIGS. 4 and 5.

Figure 4:
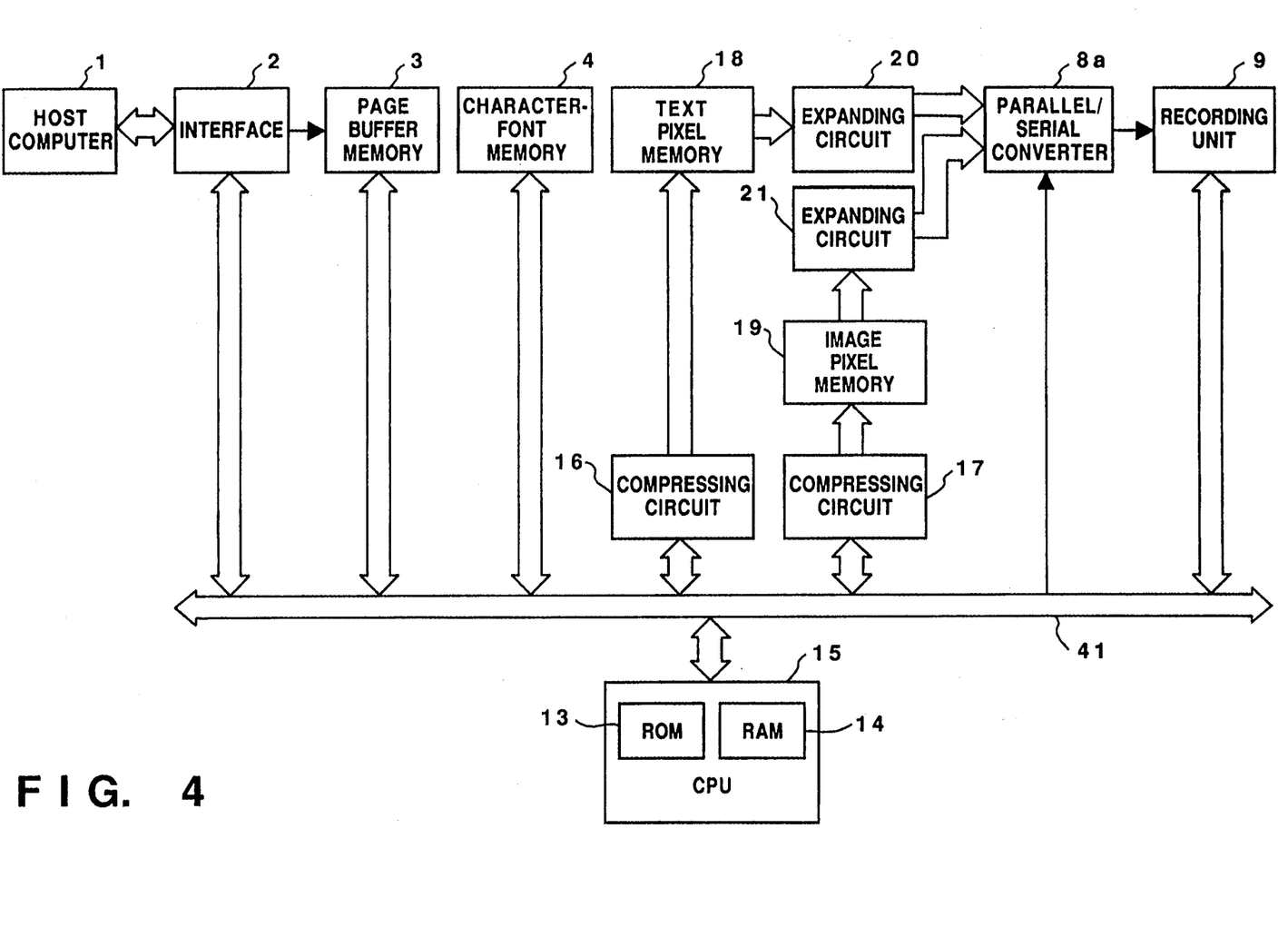
FIG. 4 is a block diagram illustrating the construction of a printer control unit in a printer apparatus according to a second embodiment of the present invention.

FIG. 4 is a block diagram illustrating the construction of the printer control unit 101 according to a second embodiment. Portions similar to those shown in FIG. 1 are designated by like reference characters and need not be described again.

Numeral 18 denotes a pixel memory for text data. The memory 18 stores text image data as image data obtained by developing a character pattern from a character code and compressing the pattern data at a desired compression ratio by a compressing circuit 16. Numeral 19 designates a pixel memory for image data. Data read in from an image input unit (not shown) such as a scanner or the like is compressed at a desired compression ratio by a compressing circuit 17, after which the resulting data is stored in the memory 19 as image data. Numerals 20, 21 denote expanding circuits for expanding the image data read out of the text pixel memory 18 and image pixel memory 19, respectively. The text data and image data expanded and read out of the expanding circuits 20, 21 are applied to a parallel-serial converter 8a which takes the logical AND between these items of data and converts the parallel data to serial data. The serial data is sent to the recording unit 9 as raster data.

Figure 5:
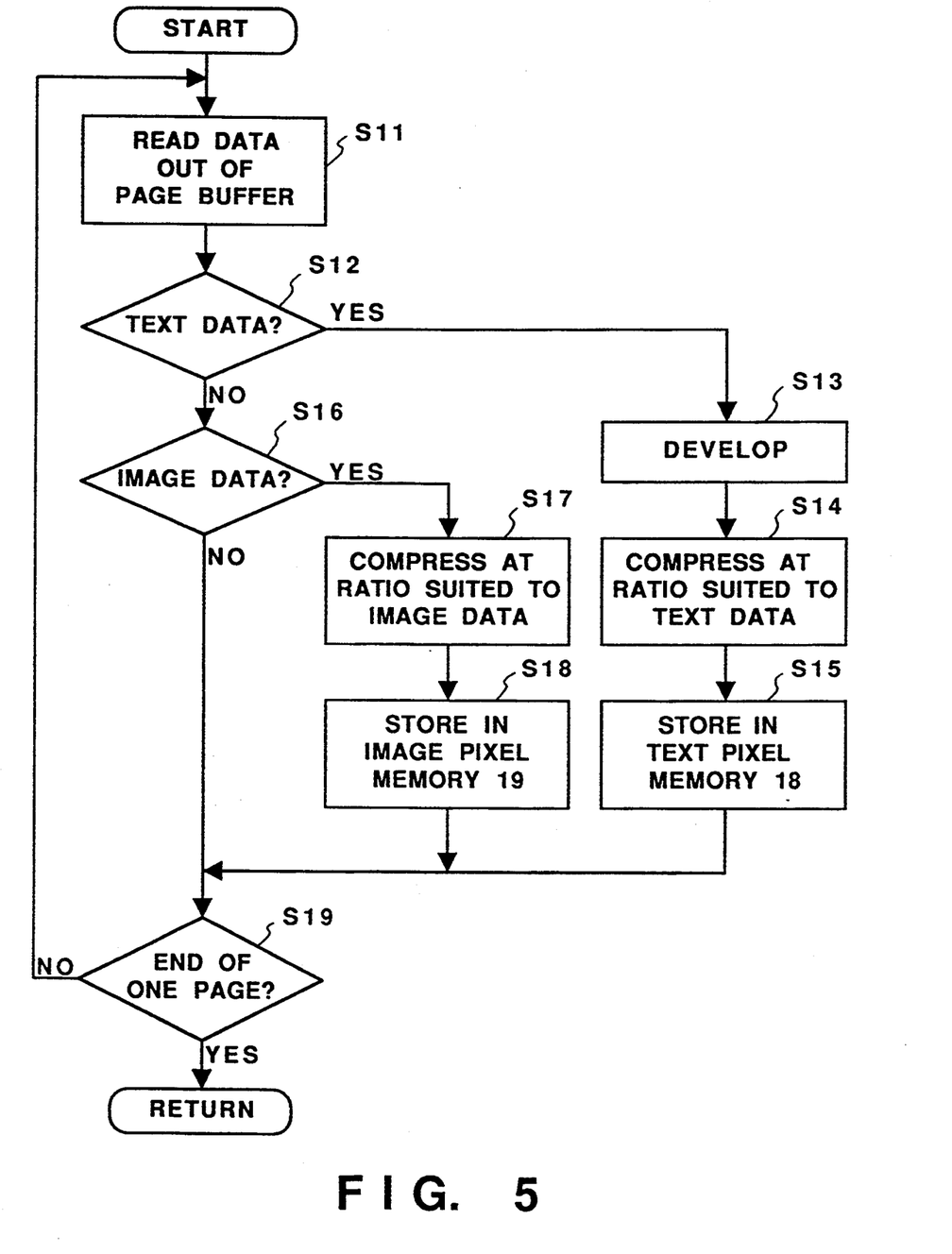
FIG. 5 is a flowchart showing bit-map development processing in the printer apparatus of the second embodiment.

Numeral 15 denotes a CPU having a ROM 13 and a RAM 14 for controlling page editing and recording processing in accordance with a control program, stored in the ROM 13, indicated by the flowchart of FIG. 5. The RAM 14 is used as a working area during execution of various programs.

The operation of this embodiment will now be described with reference to the flowchart shown in FIG. 5.

At step S11 of the flowchart, recording information (hereinafter referred to as recording data) inputted from the host computer 1 is read out of the page buffer memory 3. The recording data that has been stored in the page buffer memory 3 includes control data which indicates whether the recording data is text data or image data, as well as character codes and various control codes in case of text data and, in case of image data, the image data itself, which is represented by a bit map. On the basis of the control data, it is determined at step S12 whether the recording data that has been stored in the page buffer memory 3 is text data. If it is text data, the program proceeds to step S13, at which the text data is developed into a character pattern upon referring to the character-font memory 4. The data is then compressed by the compressing circuit 16 at step S14 at a compression ratio suited to the text data, namely a compression ratio which will not markedly detract from the recording quality. The program then proceeds to step S15, at which the image of the text data thus compressed is stored in the text pixel memory 18.

In a case where it is determined that the data inputted at step S12 is not text data, the program proceeds to step S16, at which it is determined, based upon the aforementioned control data, whether the data is image data. In a case where the data is determined to be image data at step S16, the program proceeds to step S17, at which the image data is compressed by the compressing circuit 17 at a prescribed compression ratio suited to the image data.

In general, a decline in picture quality of image data is small even when the image data is compressed at a compression ratio several tens of times that of text data. Consequently, the image data can be compressed at a compression ratio higher than that used in the case of text data.

The program proceeds from step S17 to step S18, where the image data compressed at step S17 is stored in the image pixel memory 19.

If it is determined at step S16 that the input data is not image data, then the program proceeds to step S19, at which it is determined whether one page of pattern-development processing has ended. If it has ended, the program returns to the original processing routine. If one page of processing has not ended, then the program returns to step S11 so that execution of the above-described procedure is repeated.

In the foregoing embodiment, data compression/expansion is implemented by hardware. However, this does not impose a limitation upon the invention, for compression/expansion can be implemented by software.

Further, it has been described in this embodiment that image data is compressed at a higher compression ratio than in the case of text data. However, by providing a plurality of image pixel memories, an image whose quality is desired to be maintained without any decline can be compressed at a low compression ratio and stored in another image pixel memory, then the compressed image can be read out of this memory, expanded and outputted.

Thus, in accordance with the second embodiment of the invention as described above, text data and image data are stored in a pixel memory for text data and a pixel memory for image data, respectively, upon being compressed at different compression ratios. This has the following advantages:

(1) A decline in the recording quality of text data can be prevented.

(2) When there is a large quantity of image data, as in a case where recording is performed using a color printer, the compression ratio of the image data is raised, thereby making it possible to reduce the memory capacity of the pixel memory.

The present invention may be applied to a system constituted by a plurality of apparatus or to a single apparatus. Further, it goes without saying that the invention is applicable also to a case where a program for implementing the invention is supplied to a system or apparatus.

Though use of a laser-beam printer is described in the foregoing embodiments, the invention is not limited to such a printer. The invention is applicable to printers which rely upon other recording methods, such as thermal-transfer printers and ink-jet printers.

As many apparently widely different embodiments of the present invention can be made without departing from the spirit and scope thereof, it is to be understood that the invention is not limited to the specific embodiments thereof except as defined in the appended claims.

What is claimed is:

1. An output apparatus which converts input information into bit-map information and outputs the bit-map information, comprising:
   discriminating means for determining whether the input information is text data or image data;
   pattern developing means for subjecting text data discriminated by said discriminating means to pattern development to provide text pattern data;
   first compressing means for compressing the text pattern data at a first compression ratio to provide compressed text pattern data;
   first memory means for storing the compressed text pattern data;
   second compressing means for compressing image data discriminated by said discriminating means at a compression ratio larger than said first compression ratio to provide compressed image data;
   second memory means for storing the compressed image data;
   first expanding means for reading out and expanding the compressed text pattern data stored in said first memory means;
   second expanding means for reading out and expanding the compressed image data stored in said second memory means; and
   output means for outputting the pattern data and image data from said first and second expanding means.

2. An output apparatus which converts input information into bit-map information and outputs the bit-map information, comprising:
   discriminating means for determining whether the input information is text data or image data;
   pattern developing means for subjecting text data discriminated by said discriminating means to pattern development upon referring to a font memory to provide pattern data;
   a first compressing circuit for compressing the pattern data at a first compression ratio to provide compressed pattern data;
   a first pixel memory for storing the compressed pattern data;
   a second compressing circuit for compressing image data discriminated by said discriminating means at a compression ratio larger than said first compression ratio to provide compressed image data;
   a second pixel memory for storing the compressed image data;
   a first expanding circuit for reading out and expanding the compressed pattern data stored in said first pixel memory;
   a second expanding circuit for reading out and expanding the compressed image data stored in said second pixel memory; and
   an outputting unit for outputting pattern data and image data from said first and second expansion circuits.

3. An output apparatus which converts input information into bit-map information and outputs the bit-map information, comprising:
   compression means for compressing the bit-map information at a compression ratio;
   detecting means for detecting a characteristic of the input information;
   judging means for judging whether or not said compression ratio is to be changed before said compression means compresses the bit-map information in accordance with the detected characteristic of the input information; and
   correcting means for correcting the bit-map information in response to a judgment by said judging means that the compression ratio is to be changed.

4. An output apparatus according to claim 3, further comprising expanding means for expanding compressed bit-map information compressed by said compression means.

5. An output apparatus according to claim 4, further comprising print means for printing the expanded bit-map information.

6. An output apparatus according to claim 3, wherein the compression ratio is not to be changed when the input information is image data.

7. An output apparatus according to claim 3, wherein the compression ratio is to be changed when the input information is text data including at least character codes and control codes.

8. An output apparatus according to claim 3, wherein said correcting means corrects thin line portions of the bit-map information by thickening the portions.

9. An output apparatus according to claim 3, wherein said output apparatus is a printer apparatus.

10. An output method for converting input information into bit-map information and outputting the bit-map information, comprising the steps of:
    compressing the bit map information at a compression ratio;
    detecting a characteristic of the input information;
    judging whether or not the compression ratio is to be changed before the bit-map information is compressed in accordance with a characteristic of the input information; and
    correcting the bit-map information in response to a judgment that the compression ratio is to be changed.

11. An output method according to claim 10, further comprising a step of expanding compressed bit-map information.

12. An output method according to claim 11, further comprising a step of printing the expanded bit-map information.

13. An output method according to claim 10, wherein the compression ratio is not changed when the input information is image data.

14. An output method according to claim 10, wherein the compression ratio is changed when input information is text data including at least character codes and control codes.

15. An output method according to claim 10, wherein said correcting step corrects thin line portions of said bit-map information by thickening the portions.

16. An output method according to claim 10, wherein said output method is performed in a printer apparatus.

* * * * *